United States Patent [19]
Butcher et al.

[11] 4,233,471
[45] Nov. 11, 1980

[54] AUTOMATIC TELECOMMUNICATION EXCHANGE SYSTEM

[75] Inventors: John A. W. Butcher, Stansted; Michael A. Salino, Hatfield, both of England

[73] Assignee: Standard Telephones and Cables Limited, London, England

[21] Appl. No.: 973,695

[22] Filed: Dec. 27, 1978

[30] Foreign Application Priority Data

Jan. 3, 1978 [GB] United Kingdom ............... 00040/78

[51] Int. Cl.³ .......................... H04B 1/72; H04J 3/14
[52] U.S. Cl. .................................................. 178/69 G
[58] Field of Search .................. 179/15 BF, 175.2 C; 178/69 G; 325/67; 340/502, 503, 504, 506

[56] References Cited

U.S. PATENT DOCUMENTS

| | | | |
|---|---|---|---|
| 3,839,707 | 10/1974 | Woodward et al. | 179/15 BF |
| 3,996,423 | 12/1976 | Colton et al. | 179/15 BF |
| 4,055,808 | 10/1977 | Holsinger et al. | 178/69 G |

*Primary Examiner*—Thomas A. Robinson
*Attorney, Agent, or Firm*—James B. Raden; Donald J. Lenkszus

[57] ABSTRACT

A system for centralized reporting of alarm conditions in a multinode data handling system includes an alarm concentration unit at each node of the system for collecting alarm conditions. Each alarm concentration unit is coupled to a signal transmission unit which generates alarm messages and transmits the messages to a centralized node. The centralized node includes means for comparing each received messages with previously received messages stored in a memory and for amending the memory when the most recent received message differs from a previously stored message.

4 Claims, 5 Drawing Figures

AUTOMATIC TELECOMMUNICATION EXCHANGE SYSTEM

BACKGROUND OF THE INVENTION

This invention relates to a system for indicating the incidence of alarm conditions in a large data handling system, such as a multi-exchange telecommunication system.

In telecommunication systems currently under development, it is visualized that there will be a number of telecommunication exchanges, referred to as system nodes, some of which may be purely transit switching centers while others will have subscribers connected directly to them. Some of the latter exchanges will, of course, also be transit exchanges. In such systems as currently visualized, there is to be some centralized control. This centralized control includes means for collecting alarm indications from the individual nodes for display at a centralized point serving a number of the nodes. Hence the object of this invention is to provide a system for the centralized collection and indication of such alarms.

SUMMARY OF THE INVENTION

According to the present invention there is provided an electrical signalling system for the centralized reporting of alarm conditions in a multinode data handling system. Each node of the system includes an alarm concentration unit for collecting alarm conditions occurring at its associated node. Each alarm concentration unit is coupled to a signal transmission unit from which transmission occurs to a centralized node. The centralized node includes signal reception means at which information from the system nodes which relate to alarm conditions is received. The information is applied via a supervising unit to an alarm and display control unit for indication of said alarms. The information as sent from a signal transmission unit to the signal reception means consists of messages each of which includes at least the identity of the node from which the message was sent, plus all of the categories within which alarm conditions are present at the originating node.

DESCRIPTION OF THE DRAWINGS

An embodiment of the invention will now be described with reference to the accompanying drawings, in which.

DETAILED DESCRIPTION

The system described herein for dealing with alarm conditions includes at each node or exchange of the telecommunication system an alarm concentration unit at which the alarms generated at that node are concentrated. Associated with each such unit there is a signal transmission unit which receives information therefrom and transmits it to a signal reception unit forming part of a local administration center at which alarm information for a number of nodes is assembled for display and possibly also recording in some permanent form. Each message thus sent includes the identity of the reporting exchange, plus indications of every category in which its exchange has a fault condition.

In a relatively large system it is visualized that there may be several local administration centers, in which case facilities are provided for signalling alarm information between these centers. This is particularly useful under low-traffic conditions, e.g. at night when less than the full number of such centers are manned.

Figure 1:
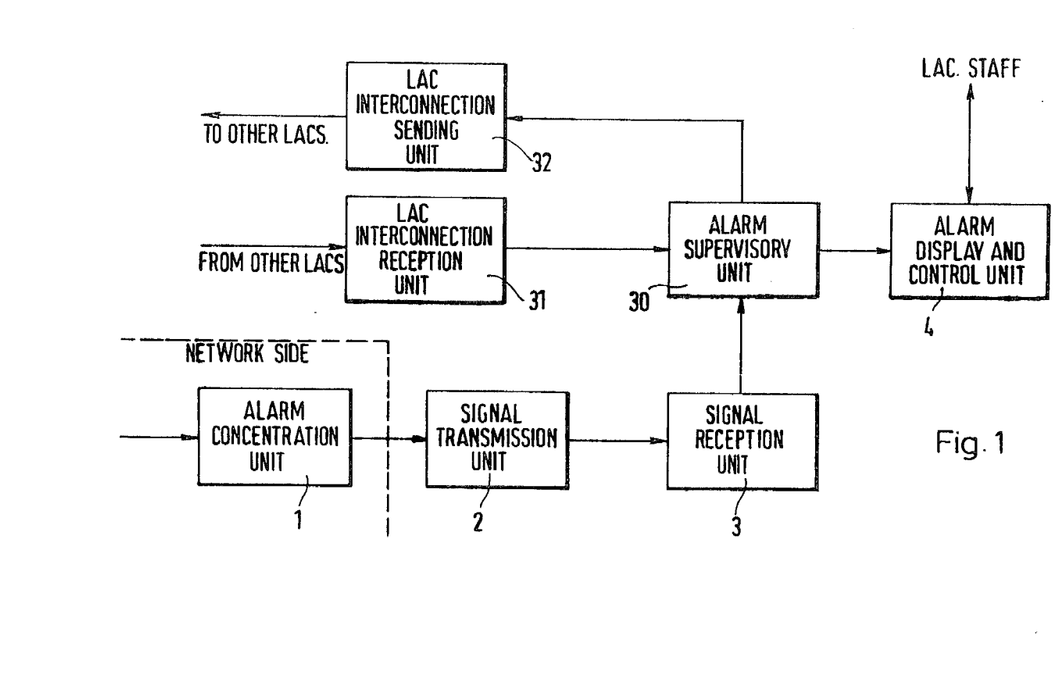
FIG. 1 is a simplified block diagram of the alarm transmission subsystem, which forms part of a system which embodies the present invention.

Referring now to FIG. 1, which shows in block form the Alarm Termination Sub-system (ATS) organization, it will be seen that the alarm concentration unit (ACU) 1 is on the "network" side, i.e. it belongs to the exchange equipment associated with a node, and that it is coupled via a simple interface to a signal transmission unit (STU) 2. The unit 1 assembles the various categories in which alarms occur so that they can be sent by the unit 2 to the local administration center (LAC).

The interface between units 1 and 2 is a simple d.c. interface with one circuit for each alarm category. It includes an electro-magnetic relay in the ACU for each alarm category, which relay is normally held operated when there is no alarm in its category. The principal contact of this alarm relay is a single "make", which under "no-alarm" conditions is held closed so that a pair of wires which extends to the ACU 1 from the STU 2 is closed. When an alarm is to be signalled the appropriate relay releases, to open its contact. Such use of a relay provides electrical isolation between the ACU and the STU.

The alarm concentration unit 1 is associated with its node's control equipment such that it receives information as to the categories of alarms present at the node.

Figure 2:
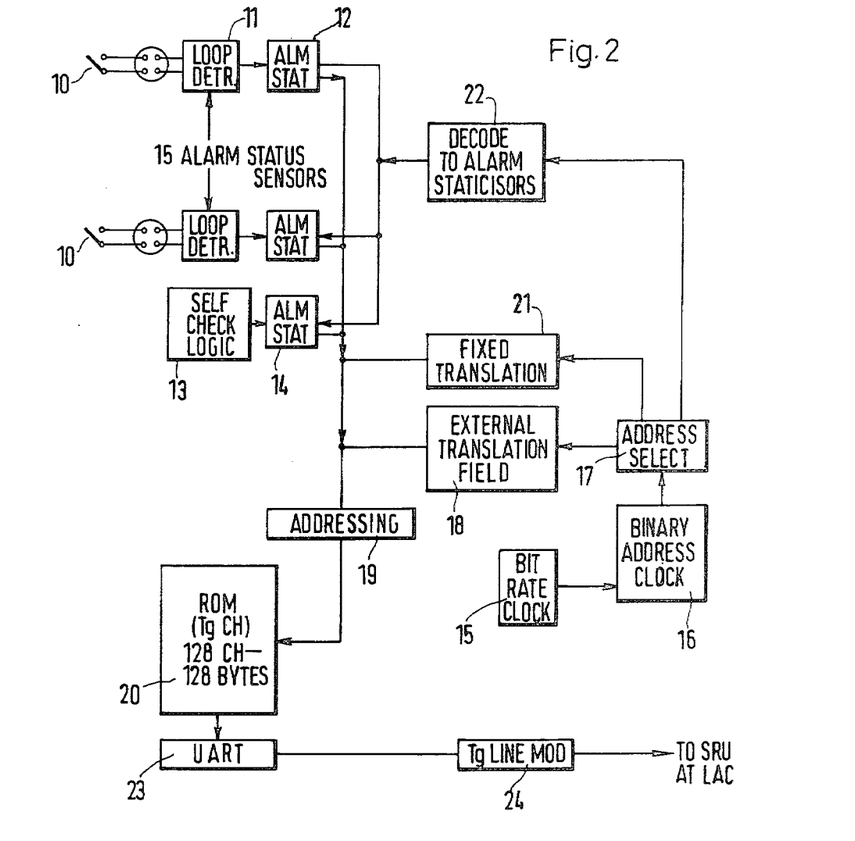
FIG. 2 is a simplified block diagram of a signal transmission unit used in a system which embodies the invention.

The STU will now be considered in more detail with reference to FIG. 2. This unit translates the alarm indication conditions coming to it via the interface into an appropriate message format for transmission to the signal reception unit (SRU) 3 at the LAC. The STU also generates the identity of the reporting exchange as part of each message which it sends, and imposes an additional alarm category for self-alarm reporting. In the present arrangement provision is made for 15 exchange alarm conditions, plus a 16th one for the STU's self-alarm reporting.

The messages which are periodically sent from an STU to the SRU at the LAC are 32-character messages, each of which includes a 7-character alpha-numeric identity code of the reporting exchange, and allows for the 15 alarm categories referred to above. Character positions 31 and 32 contain Carriage Return and Line Feed signals respectively to enable tabular print out of the whole message if this is needed. Character positions 8, 9, 10, 27, 28, 29 and 30 are not currently used, and hence if 7 characters is inadequate for the exchange identities, these could be extended by using characters 8, 9 and/or 10, as required. Similarly if more alarm categories are called for, positions 27–30 are available. The characters are in the ITA No. 5 Code (BS 4730), which has parity and start and stop bits, so that each character has 11 bits, transmission is at 10 characters per second, i.e. a transmission rate of 110 baud, and a complete message is sent every 3.2 seconds. There is no break between successively-sent messages, and this feature is used at the SRU to indicate that the line between the STU and the SRU is unbroken.

The ITA No. 5 code was chosen because of its error-checking potential.

For further processing within the ATS, if the message contains a positive alarm indication it is processed as a 32-character block, and eventually drives an alarm display unit 4. The display is an electro-luminescent panel.

Transmission between the STU 2 and the SRU 3 can be via a 110 baud d.c. telegraph circuit, but if (as is usually the case) such a circuit is not readily available, V.F. transmission at 2280 Hz is to be used.

Referring now to FIG. 2, the interface from the ACU is shown in the upper left-hand corner and comprises the relay contacts 10 which are located at the ACU. One set of contacts 10 is provided for each alarm category. Each set of contacts 10 is coupled by a pair of wires as shown to a loop detector such as 11, each having associated with it an alarm status register such as 12. Note that the STU's self-check logic 13 also has an alarm status register 14.

The arrangement is driven by a 110 baud bit rate clock 15 which drives a binary address clock 16, which can count up to 32, thus providing for the basic 32 character messages. Via an address select unit 17, characters 1-7 (the exchange identity code) are routed via external translation field 18 to control the addressing means 19 of a read-only memory (ROM) 20. This ROM contains telegraph characters in an 8-bit format. The translation field 18 is the means by which the discrete source identity is imposed on the STU when it is inserted into its position on the rack at the reporting exchange.

Characters 31 and 32 are routed from the address select unit 17 via a fixed translation field 21 to cause the ROM 20 to be addressed. ROM 20 will in turn provide CR and LF characters. Characters 11-26 from the address select unit 17 are routed via a decoder 22 to the fifteen alarm status registers 12 and the alarm status register 14 so that all the status registers, including the one for STU's self check, are scanned successively. Dependent on whether or not an alarm condition is indicated, an appropriate character address is generated and accessed in the ROM 20. Under no-alarm conditions, a character position is set to convey the dash character. To indicate a positive alarm, one can send A for alarm in each appropriate character position, or a positive alarm in each category can be indicated by a separate and discrete character, which may ease the recognition of a particular alarm category on the display and could also enable a limited variation in the alarm categories between different STU's (if different sorts of STU's are used).

At the end of the 32 character count the whole cycle is repeated.

The output of the ROM 20, which is a 32 character message, is marked into a buffer 23, which acts as a parallel-serial converter, from which it is transmitted serially via a modulator 24, this being a simple 2280 Hz keying operation.

The various elements of the STU, shown in FIG. 2, are not described in detail, as each of them can follow conventional practice, preferably using integrated circuitry.

Figure 3:
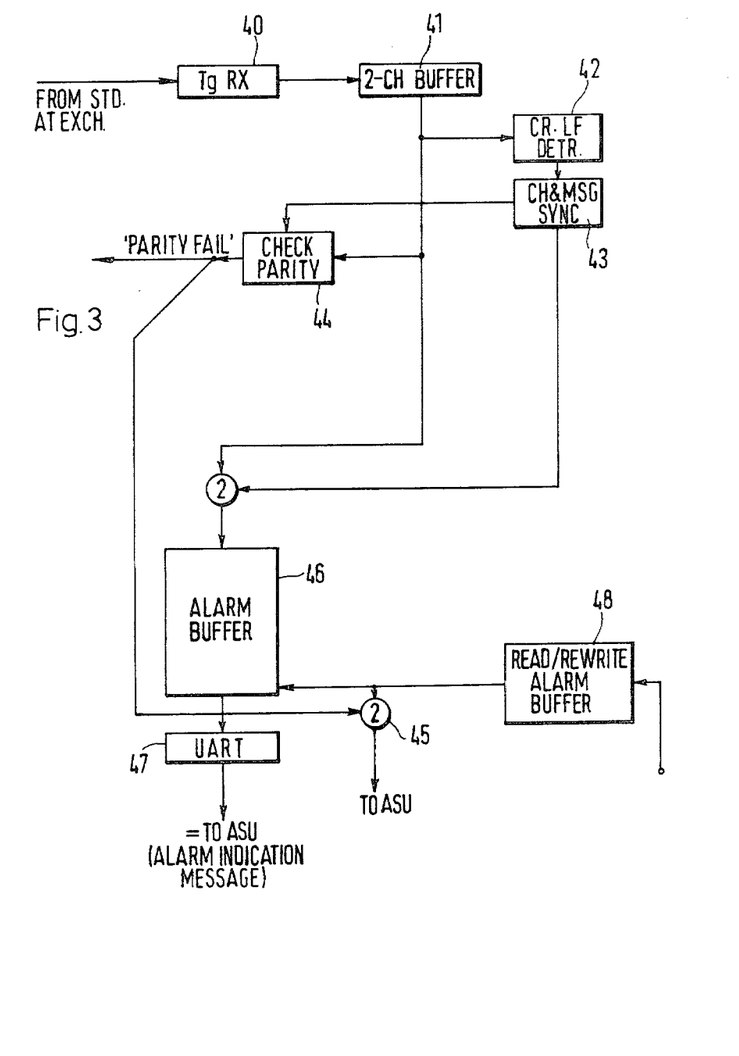
FIG. 3 is a simplified block diagram of a signal receiving unit as used in a system which embodies the invention.

Within the ATS equipment at the LAC, the signal reception unit SRU, FIG. 3, detects all the incoming messages originated by the STU to which it is connected, there being a one-to-one correspondence between STU's and SRU's. Note that in other embodiments of the invention some other ratio may be preferred.

With the strict allocation of one SRU to one STU, the STU for a remote concentrator is located in the controlling exchange. That STU would relate to that concentrator, and not to the controlling exchange, which would have its own STU.

The external translation field 18 can conveniently be provided as part of the back plane wiring on the rack into which the STU plugs, which needs decoupling and gating diodes within the STU. This in effect limits the translation field to simple wire strips.

Figure 4:
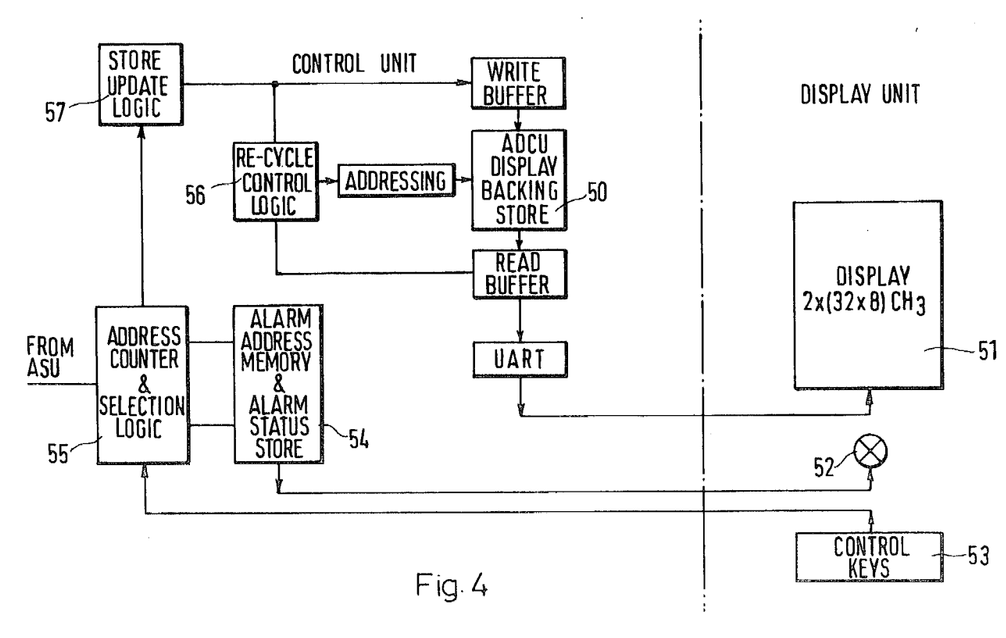
FIG. 4 is a simplified block diagram of an alarm display and control unit forming part of a system which embodies the invention.

The basic function of the SRU is to store the alarm indication messages, and to offer them to the alarm supervisory unit 30, FIG. 4, from which they control the alarm display and control unit 4. The unit 30 can also receive messages from other LAC's, such messages arriving via the LAC Interconnection Reception Unit 31, when some of the LAC's are closed down. Similarly, if the LAC shown is closed down, messages reaching it are sent from the unit 30 via the LAC Interconnection Unit 32 to the other LAC's.

Note that the "inter-LAC" communication referred to above may take place during normal operation with all LAC's functioning, if this is considered desirable.

At the SRU of FIG. 3, each message from the associated STU is received in a telegraph receiver 40, from which it is applied to a buffer 41. The output of this buffer extends to a carriage and line feed detector 42, whose output controls a sync circuit 43, which maintains the receiving unit SRU in synchronism with the associated STU. The output of the buffer 41 also goes to a check parity circuit 44, which is also controlled from the sync circuit 43. This checks the parity of each character of the message—it will be recalled that the characters of the telegraph code used each includes parity bits—a repeat request being sent out to the "calling" node if there is a parity failure. The parity failure output also controls a gate 45 via which a signal is sent to the ASU in the event of parity failure to indicate that the STU-SRU link is in trouble.

The message characters on reception are passed from the buffer 41, under control of the sync circuit 43, to an alarm buffer 46, which is a random access memory with a capacity of 32 rows of 8 bits since each character (when the parity and start/stop bits are removed) has 8 intelligence bearing bits. These characters pass one at a time in series via a further buffer 47 to the ASU, when a suitable "request" signal is received therefrom. This request signal requests a transfer of the alarm information indicated by the alarm buffer contacts to the ASU, via an alarm buffer 48. In this manner the message in the buffer 46 is read out via the buffer 47. If parity has failed, however, the alarm buffer output plus the check parity output cause the gate 45 to pass a signal which "tells" the ASU that there has been a parity failure.

The alarms which are handled by the system include analogue transmission systems alarms as well as exchange alarms: such transmission alarms are usually as much as 50 times more frequent than exchange alarms, so it will be unusual for a cycle to occur without an alarm!

In the absence of a correctly functioning ASU, the 32 character alarm messages can be monitored with a suitable teleprinter at the output of the telegraph receiver. However, this would cause a printout of each and every 32 character message. As messages arrive every 3.2 seconds from each STU, the read out will be highly repetitive.

We now consider the alarm supervisory unit (ASU), 30 in FIG. 1, which is the main store in the ATS, where all the positive alarms indication messages are held. As will be recalled, these messages reach the ASU over two different paths. Over the first path messages from the exchanges under control of the ATS shown in FIG. 1 are received, while over the other path such messages reach the ASU from other LAC's via the unit 31, e.g. where night concentration to the ATS of FIG. 1 is in operation.

It is assumed that there would be a maximum of 108 STU-SRU pairs reporting to a single ASU under normal conditions, although the average is expected to be only about 25 such pairs. When night concentration is in operation there would, for the largest case contemplated, which is the Aberdeen area, be three other reporting ATS's. Hence under night concentration an ASU would have to provide for an effective 432 STU-SRU pair.

The method used to store positive alarm indication messages in the ASU store is to form a queue on the basis of last-in first-out-(LIFO). This allows new positive alarm indication messages to be placed at the head of the queue, and therefore, to be read out first to the alarm display and control unit (ADCU) 4, FIG. 1, and see also FIG. 4.

The ADCU extracts the positive alarm indication messages received from the associated ASU (30, FIG. 1), manipulates this information, and display it on the indicator panel. In the system described, at any one time alarm messages from 10 separate exchange locations are displayed, and any alarm messages not acknowledged by the staff at the LAC are indicated by a flashing condition plus an audible signal, which both disappear on acknowledgement.

The functions of units 31 and 32 have already been mentioned: when these are functioning buffer storage may be needed, since the speed of data transmission is less than the working speed of the ASU stores. The interfaces between LAC's are here assumed to be normal telephone circuits.

We now consider the ASU in more detail. As already indicated this unit is the main storage area in the ATS for all positive alarm messages. Within it, the objective is to fill a store sequentially from one end with alarm messages from the SRU's connected to it in the order of reception, so that a queue without gaps due to alarm clearances is set up—at the same time it is a requirement that the store's contents be read out to the display unit 4 such that the last accurring positive alarm indication messages shall be presented at the head of the list on the display. Hence the store for these messages is operated on the "push-down" basis if it is hardware-controlled, or in the last in first out (LIFO) basis if software-controlled.

Whichever technique is used for the store, a routine is needed which identifies when the categories of a positive alarm message already in the store change due to an up-date from the next alarm message from the same source. If a new message indicates that all previous alarm categories have cleared, it is necessary to remove the message from the ASU store and to close the gap left by this deletion. Where a new message only indicates a partial clearance, the existing record in the ASU store is over-written with the new information. Finally, if the new message indicates that new alarms exist compared with what is in the store, the complete new message is written at the top of the store so that it is read out first to the display unit. At the same time the previous message from the same source is deleted, and the gap thus caused closed up.

The main store of the ASU is based on a finite amount of storage equivalent to one complete alarm message for each reporting STU-SRU combination. Thus if gaps due to deletion are not closed up, a very large store will be needed.

Figure 5:
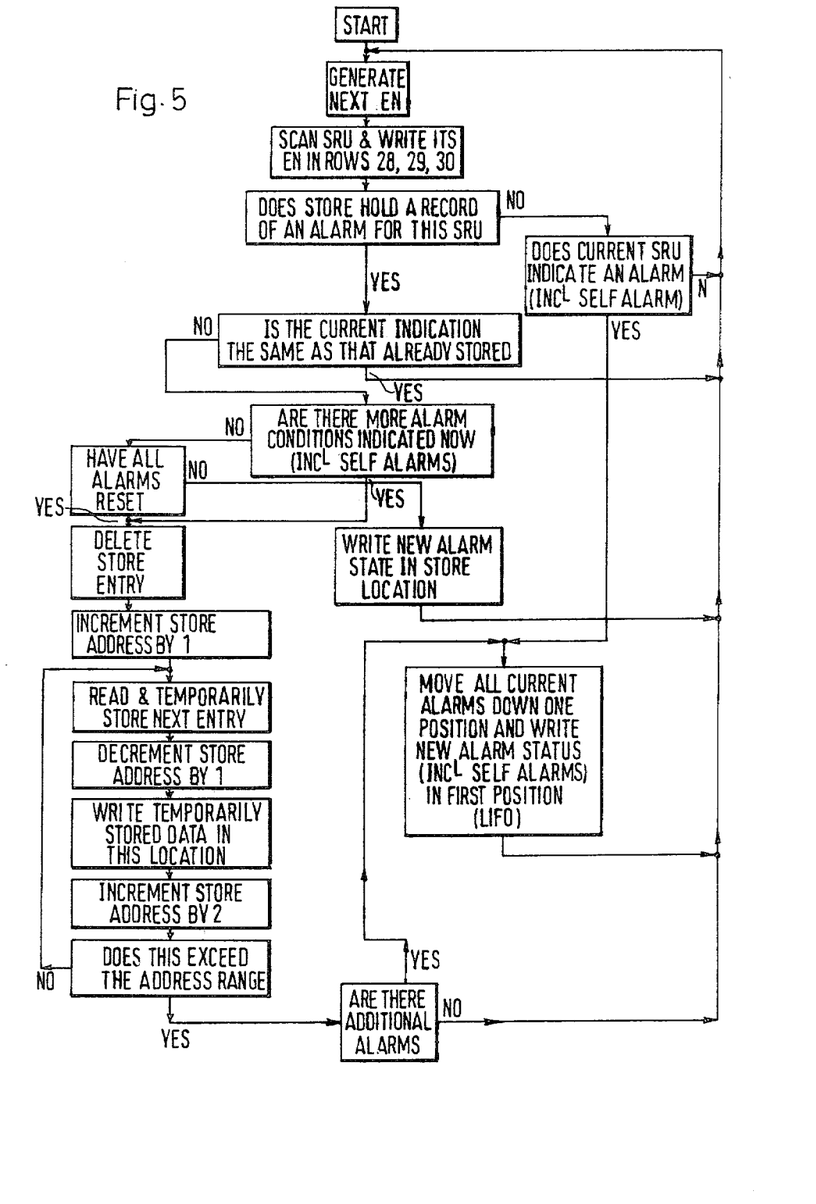
FIG. 5 is a flow diagram which relates to the operation of FIG. 3.

The above operations are summarized in the flow chart of FIG. 5, in which EN means the equipment numbers appropriate to the reporting STU's. This flow chart does not cover read-out to the backing store in the control and display unit 4, FIG. 1, as this is a simple process, which is interleaved periodically with the main queue formation. Note that the ASU must include, in addition to the main ASU store, temporary storage for holding the messages which are extracted for examination from each SRU in turn.

Under night concentration conditions, each unit 31 presents information to the unit 30 in the same format as does an SRU, and so can be regarded as a batch of SRU's. When an ASU is part of an ATS being concentrated on another ATS, the contents of the ASU main store are read out to the unit 32 for transmission to the remote LAC.

An ASU main store can hold a complete message for each of its SRU's, and for each SRU which may be connected to it under night concentration conditions. Thus we provide for 108 local exchange SRU's, plus three groups of 108 such units in night concentrations. This is a total of 432 SRU's corresponding to exchanges, plus one SRU per LAC, i.e. a total of 436 SRU's. Thus the main ASU store holds 436 positive alarm indication messages, each of 32 eight bit (as stored) characters. Thus the capacity is 13952 bytes, i.e. 111,616 bits. Thus a 16K byte store (as commercially available) may be used.

The example just quoted is extreme, and it will be seen that if the number of exchanges per ASU without night concentration allowance was 26, then a 1K byte store would suffice, with a 4K byte store being used when night concentration is used.

For each SRU or reception unit (such as 31) whose output is scanned, the contents of the ASU store are scanned to determine whether or not it holds a message for the SRU or reception unit whose output is scanned. If there is no such message in store and the current scan indicates no-alarm, the scan steps on to its next SRU or reception unit output. If there is a positive alarm indication message in store, and the output scan indicates no change, then again the scan advances to the next SRU, etc.

If the store contains no message for the location being scanned, and that location is found to be in an alarm condition, all messages in the ASU main store are "pushed down" one place and the new message put into the first or top position in the main ASU store. Then the scan moves on.

When the store contains an alarm message for the scanned location, and the current scan indicates variance between the stored information and the current information, it is necessary to determine whether the number of alarms has increased, decreased, or cleared completely. If the number of alarms has decreased, the existing information is over-written with the new positive alarm indication message for that ASU. Where the alarm conditions have all cleared, the existing entry for that source is deleted and the gap closed up. Where there are additional alarms (which includes where some have cleared but there is an equal number of new alarms), the existing record is deleted, with gap closure, and the new information is placed into the top of the ASU store as if it were a completely new message.

Much of the control operations needed in the ASU can be done, if desired, by a suitably programmed microprocessor, e.g. an INTEL 8080.

We now consider the alarm display and control unit (ADCU) 4, FIG. 1, shown in block form in FIG. 4. This takes the alarm messages from the main store in the ASU and puts them into a local backing store 50, which drives an electro-luminescent display panel 51. This display only indicates 10 of the alarm messages, but as transmission alarms (about 50 times more frequent than exchange alarms) are being handled, facilities appropriate thereto exist. Thus the whole contents of the ASU are scanned in blocks of 10 messages, with indicators below the display (as seen by a viewer) of the range of clock addresses where currently undisplayed messages reside.

The display 51 includes two 256 character alphanumeric panels, arranged to give 16 rows each of 32 characters. Thus all 8 rows of the first panel, plus 2 rows of the second are used to display a group of 10 messages each of 32 characters. The remaining 6 rows are used to indicate the addresses of blocks of positive alarm indication messages not displayed.

Each character position on a panel is settable to any one of 64 standard alpha-numeric characters, and the display is driven from a serial data stream from the store 50. The contents of the display 51 are refreshed from the store 50 approximately every 3 ms. The store contains scanning circuits for distribution, plus character generation circuitry. The serial data input stream uses the telegraph code mentioned above, constrained to 6 bits.

Normally the display only shows the 10 most recent messages. To display earlier but undealt with messages, a "roll-up" control is provided which can select any group of 10 pending messages, the group addresses thereof being indicated on the last six rows of the display. If it is desirable to indicate that non-acknowledged alarm conditions exist, this can be done by presenting appropriate information on these extra six rows.

Referring now to FIG. 4, it will be seen that the ACDU is in two parts. The display unit includes the panel 51 already described, which also includes a common lamp and/or bell circuit 52 to indicate the presence of an unacknowledged alarm condition, plus control keys 53 to initiate the roll-up action mentioned above. This is especially useful under night concentration conditions when a relative large number of otherwise undisplayed messages may be displayed at will.

The control unit includes two stores, the backing store 50 already mentioned and the store 54, which is an alarm address memory and alarm status store, and control logic which could be a microprocessor control arrangement. The store 50 is limited to the information which can be displayed by the display 51 at any one time, i.e. up to 10 messages plus additional information for rows 11–16 of the display. This store is continuously recycled, unless updated.

The store 54 holds the addresses, by row numbers, of the total amount of fault messages presented to the ACDU from the ASU main store, and for each such location there is an indication as to whether the message has been acknowledged. Thus control logic 55 associated with the store 54, and with the input from the ASU, indicates that alarm messages exist outside those being displayed, and that some of them are unacknowledged. If there are any unacknowledged messages, the devices 52 are actuated from the logic 55.

Both the stores 50 and 54 are loaded and maintained from the ASU main store. The logic 55 may be manually set by the group if keys 53 to display any desired group of messages, as already indicated.

As the positive alarm indication message address store 54 is locally updated in terms of acknowledgement status, its contents cannot be merely updated from the ASU output. Instead, for each alarm message which enters the ACDU from the ASU, the store 54 is cycled to determine whether there is an existing record of this alarm condition (see above), and if so, whether or not it is acknowledged. After this determination, the fresh information from the ASU may be written in via the address counter and selection logic 55, plus the derived status in respect of acknowledgement. This latter assumes that the fresh information does not contain alarm categories not in the original record. Hence the store 54 should always keep account of the number of alarm categories, and if after such updating from the ASU main store the number of alarms for a given address is not increased the unacknowledged/acknowledged status is unchanged. On receiving information from the ASU store for a given address, if that information contains more alarm categories (or a different combination of alarm categories) than the original, the alarm status is changed to unacknowledged to take account of the new alarm occurrence.

Note that the display backing store 50 is in effect, updated from the information from the ASU for the alarm messages, using its recycle control logic 56 and update logic 57. The information for rows 11 to 16 of the display is derived automatically from the store 55, and passes therefrom via the logic 57 to the store 50.

We now consider the sending unit 32, via which alarms messages are sent to another LAC under night concentration conditions. This unit is the sending end of a data transmission link, and information is transferred thereto from the main store in the ASU 30, the unit 32 containing a suitable modem for sending this information. As the operating speed of the ASU main store is higher than the data link's bit rate, the unit 32 includes a buffer which can hold a complete 32-character alarm message. Thus each message is fed rapidly into the buffer, from which it is read out slowly to the modem for transmission, this sequence being repeated for all messages to be sent.

The logic in the unit 32 also ensures that the messages are sent to the line in the same order as they occur in the ASU store, so that it needs to "know" the point in the ASU read-out cycle at which the alarm message succeeding the one just sent to line is being offered at the read-out point to enable storing in the buffer. To do this, the logic holds in temporary storage the read-out address of ASU for the message just sent to line, which address is incremented by one. When the ASU store read out address corresponds to the new stored address, the ASU read-out is stored in the buffer.

When all messages in the ASU store have passed to this buffer, the ASU indicates this condition to the logic in the unit 32, which is then reset to initiate a repeat of the whole cycle. This repeat is used at the receiving end for checking purposes.

Next we consider the receiving unit 31, which functions when the LAC shown is acting as the receiver under concentration conditions. This unit receives the alarm messages sent from another (and usually unmanned) LAC, there being one unit 31 for each LAC from which alarm messages are to be received. The messages arrive at the relatively slow (2.4K bit/sec) line rates, and are detected from the line by a modem, which converts them into low-level logic signals to fill a buffer store. This store has a number of sections each with a capacity of one alarm message, and its size depends on the number of STU identities being handled by the remote LAC. Thus these buffer store sections would be in general similar to the alarm buffers in the individual SRU's. Thus the buffer and control logic is in effect a multiplicity of the functions of FIG. 3, plus a distributor to ensure correct distribution of the alarm messages to the sections of the buffer store. The ASU then scans these buffer store locations to build up a queue of positive alarm indication messages in the ASU main store, as for the normal ASU operation.

In the arrangement described above, the translation field 18, FIG. 2, is the means whereby the discrete source identity is imposed on the STU when it is plugged in at the reporting exchange. However, DIL and "thumb-wheel" switch arrangements on the STU printed circuit board are the methods.

What is claimed is:

1. A centralized alarm reporting system for a data handling system having a plurality of nodes, comprising:
    a plurality of alarm concentration means, each of said plurality of alarm concentration means having connections to a corresponding one of said nodes for detecting alarm status information of a plurality of points;
    a plurality of signal transmission means each comprising first receiving means for receiving said alarm status information from a corresponding one of said alarm concentration means, a plurality of first storing means each adapted to store said alarm status information from said plurality of points, means for scanning said plurality of first storing means and for generating message characters, each of said message characters being representations of the alarm status information stored in one of said plurality of first storing means, means for generating information identifying the node providing said received alarm status information, and means for forming messages, each of said messages comprising said identifying information and said characters generated during a scan of said first storage means;
    a plurality of signal reception means each adapted for receiving and storing said messages from at least one of said plurality of signal transmission means, said signal reception means comprising receiving means for receiving said messages, first memory means for storing at least a portion of each received message, and means for reading and transmitting information stored in said first memory means in response to a request signal; and
    alarm supervisory means including means for generating said request signal and retrieving said information from said signal reception means, second memory means for storing said retrieved information, means for comparing said retrieved information with information stored in said second memory means, and means responsive to said comparing means for amending the contents of said second memory means when said retrieved information is not identical to information stored in said second memory means.

2. A centralized alarm reporting system in accordance with claim 1, further comprising:
    alarm indication means, third memory means, said third memory means being adapted to receive and store selected ones of said information stored in said second memory means, and means for supplying information from said third memory means to said alarm indication means.

3. A centralized alarm reporting system in accordance with claim 1, wherein:
    said signal transmission means comprises counting means, and means responsive to address information for generating characters, said identifying information generating means comprising means responsive to said counting means for supplying address information to said character generating means, such that said character generating means provides said identifying information comprising address characters,
    said scanning and generating means comprising means responsive to said counting means for sequentially reading each of said plurality of first storing means and for supplying alarm status address information to said character generating means, said character generating means being responsive to alarm status address information to provide alarm status characters.

4. A centralized alarm reporting system for a data handling system in accordance with claim 3, wherein said signal transmission means comprises means responsive to said counting means for supplying control address information to said character generating means, said character generating means being responsive to said control address information to provide control characters.

* * * * *